No. 735,423. PATENTED AUG. 4, 1903.
F. W. TAYLOR & H. L. GANTT.
PYROMETER.
APPLICATION FILED OCT. 23, 1899.
NO MODEL. 3 SHEETS—SHEET 1.
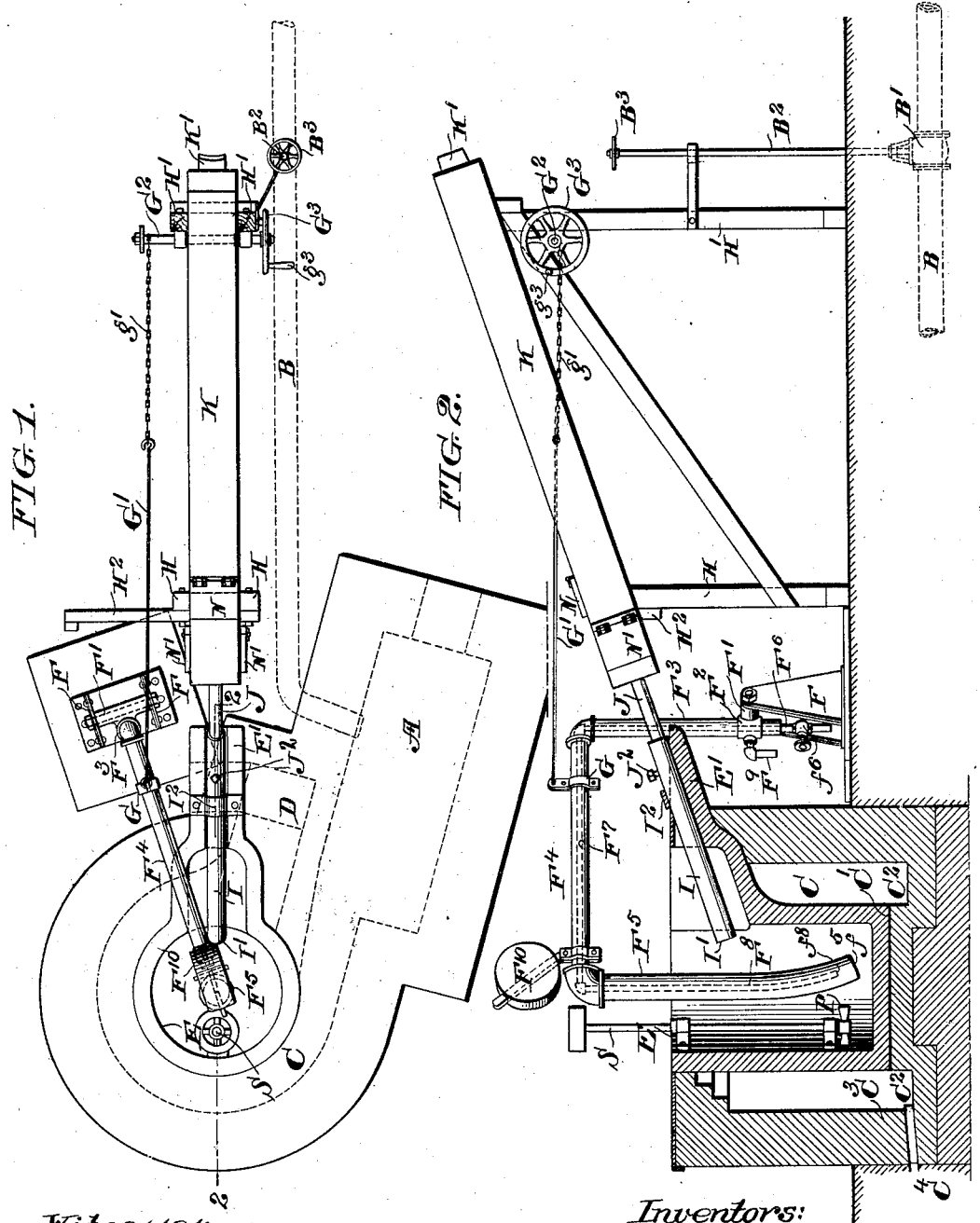

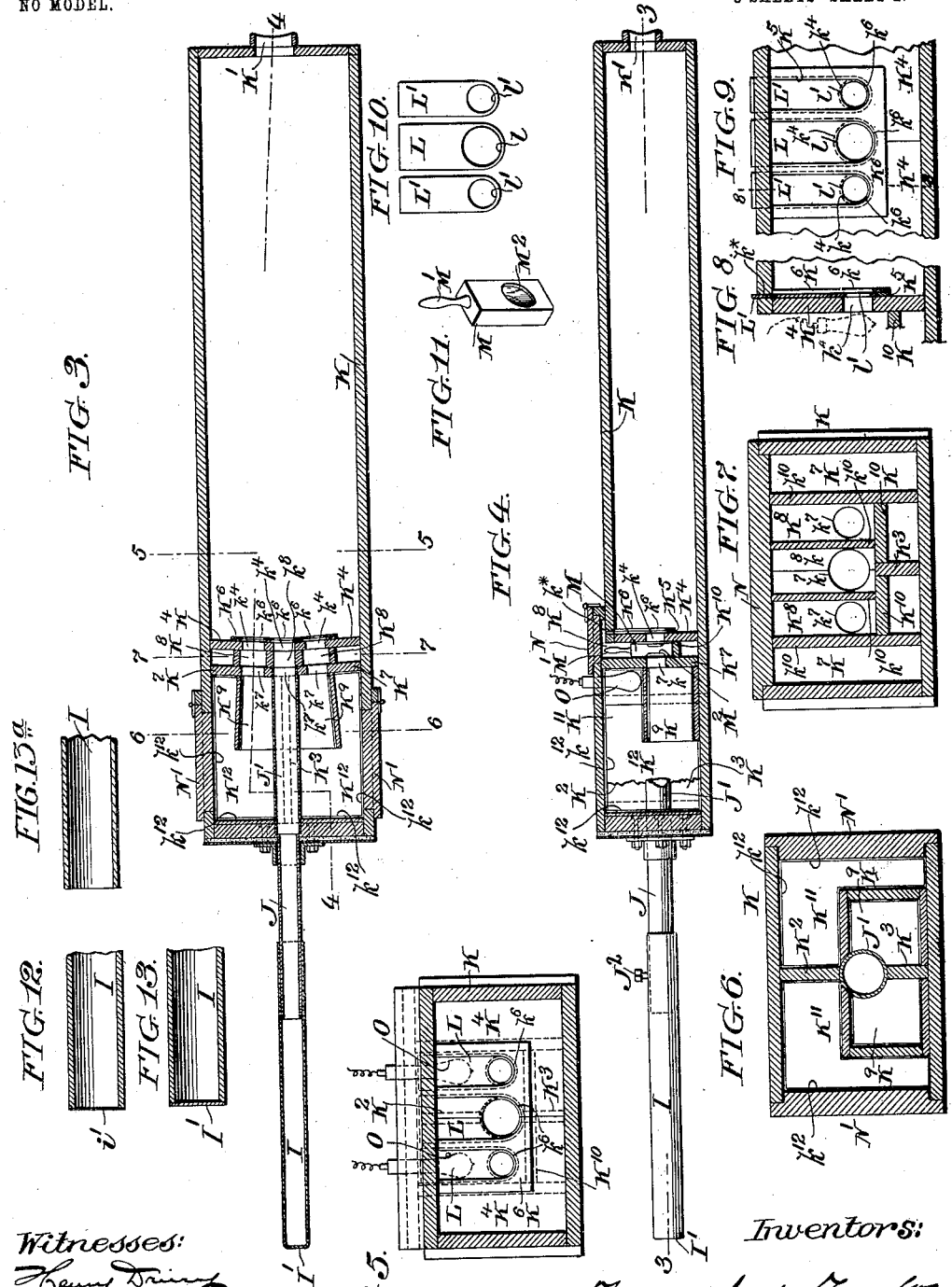

No. 735,423. PATENTED AUG. 4, 1903.
F. W. TAYLOR & H. L. GANTT.
PYROMETER.
APPLICATION FILED OCT. 23, 1899.
NO MODEL 3 SHEETS—SHEET 3.
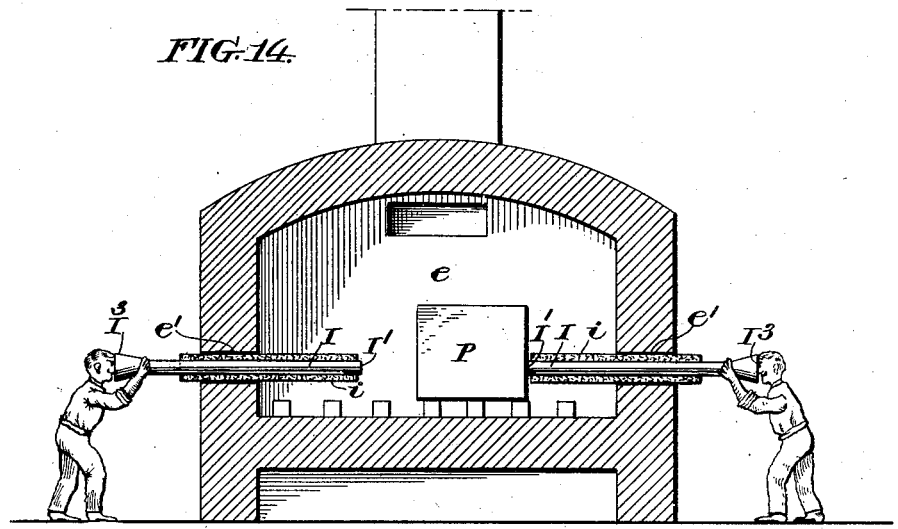
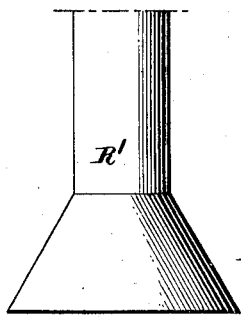
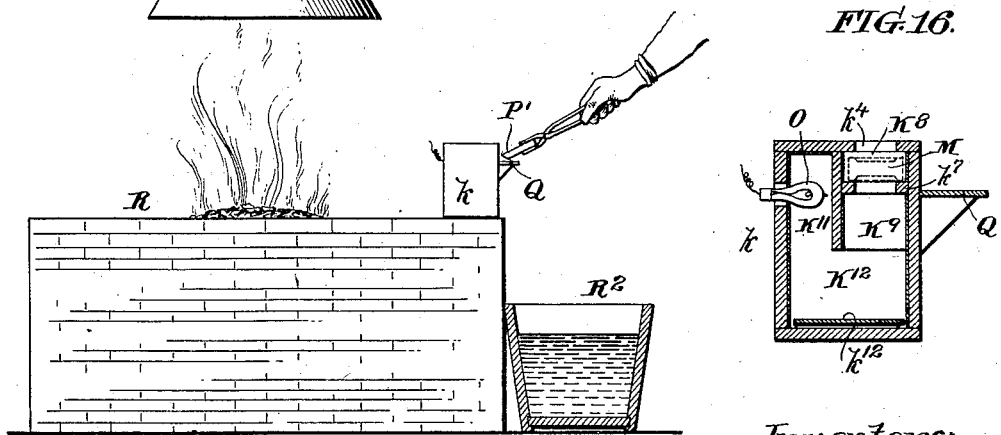

No. 735,423. Patented August 4, 1903.

UNITED STATES PATENT OFFICE.

FREDERICK W. TAYLOR AND HENRY L. GANTT, OF SOUTH BETHLEHEM, PENNSYLVANIA, ASSIGNORS, BY MESNE ASSIGNMENTS, TO MORSE THERMO-GAGE CO., OF TRUMANSBURG, NEW YORK.

PYROMETER.

SPECIFICATION forming part of Letters Patent No. 735,423, dated August 4, 1903.

Application filed October 23, 1899. Serial No. 734,456. (No model.)

*To all whom it may concern:*

Be it known that we, FREDERICK W. TAYLOR and HENRY L. GANTT, citizens of the United States of America, residing in South Bethlehem, Northampton county, State of Pennsylvania, have invented a new and Improved Pyrometer, of which the following is a true and exact description, reference being had to the accompanying drawings, which form a part thereof.

Our invention relates to the construction of pyrometers, and particularly to the class of pyrometers known as "optical" pyrometers.

The objects of our invention are, primarily, to provide a pyrometer of simple and efficient construction and by means of which the color and the intensity of the light emitted from heated bodies can be compared with the color and intensity of light emitted from a body placed so as to be simultaneously in the line of vision with the object to be observed and the color of which emitted light with its relationship to the color of the light emitted from the body to be observed at certain temperatures is known. While the standard light used in our pyrometer may be that emitted by a body glowing under the influence of heat, we greatly prefer that the emitted light used as a standard of comparison should be that colored by transmission through and emission from a translucent colored medium, and preferably use as the translucent colored medium a body of fluid having the proper color and contained between transparent walls.

Another important feature of our invention consists in the use of a metallic tube the open end of which is in the direct line of vision for the observer using the pyrometer, while the farther end is closed and heated either by contact with or immersion in the furnace or melted metal to be observed, so that the temperature of said object is ascertained not by means of the light directly originating in it, but by means of the light incident to the heating to the same temperature as the object of the closed end of the tube. This feature of our invention gives us at all times a metal of identical character and form with which the comparison of color is to be made and also effectually excludes from the interior of the pyrometer all gases, smoke, &c., which might tend to obscure the observation, enabling us also to dispense with the use of glass partitions in the pyrometer with their well-known tendency to become obscured. The closed-ended metallic tube can be used in connection with other forms of pyrometer than that specially described herein, and even used alone as a means of ascertaining approximately the temperature of the chamber in which it is inserted, the broad invention of the combination of such a tube with a heated receptacle forming the subject-matter of our application for Letters Patent filed August 13, 1900, Serial No. 26,740.

Another important feature of our invention consists in so arranging the pyrometer in relationship to a metal pot that the closed-ended tube is immersed in said pot and in practice covered by some fused metal contained in the pot and which in turn is used for heating or cooling tools to the temperature of said fused metal, and in this connection we preferably provide means for cooling the contents of the pot and also means for regulating the heat of the furnace by which the pot is heated, so that the heat of the fused metal can be nicely regulated and held substantially at any desired temperature. This pot and its connections other than the pyrometer forms the subject-matter of our application for Letters Patent filed July 21, 1900, Serial No. 24,375.

The method of determining or determining and regulating temperature by comparing the color and intensity of the light emitted by the heated object under consideration with the color and intensity of the light emitted from and preferably transmitted through a standardized medium and while making such comparison regulating the heat of a chamber or receptacle to bring it to the determined heat is new with us and forms the subject-matter of our application for Letters Patent filed October 21, 1899, Serial No. 734,289, our present case being limited to structural features and combinations of the pyrometer and apparatus designed for carrying said method into effect.

Our invention involves many other details, which, however, will be best understood as described in connection with the drawings, in which our pyrometer and its coacting devices are illustrated, and in which—

Figure 1 is a plan view of the device; Fig. 2, a side elevation thereof, partly in section, on the line 2 2 of Fig. 1. Fig. 3 is a longitudinal section through the pyrometer, taken as on the line 3 3 of Fig. 4. Fig. 4 is a vertical section taken on the irregular line 4 4 of Fig. 3. Fig. 5 is a cross-section taken on the line 5 5 of Fig. 3; Fig. 6, a cross-section taken on the line 6 6 of Fig. 3; Fig. 7, a cross-section taken on the line 7 7 of Fig. 3. Fig. 8 is a vertical section taken on the line 8 8 of Fig. 9; Fig. 9, a fragmentary view of a portion of the construction shown also in Fig. 5; Fig. 10, a face view of a slide used in connection with a pyrometer. Fig. 11 is a perspective view of a bottle adapted to hold the colored transparent medium which we prefer to employ. Fig. 12 is an enlarged view of the end of the pipe I, showing the closing of said end by a thin diaphragm. Fig. 13 is a similar view indicating the closing of the end of the pipe by metal substantially as thick as the walls thereof. Fig. 13$^a$ is a similar view of the pipe when said end is open. Fig. 14 is a sectional view of an annealing-furnace, showing a mode of using the closed-ended-tube feature of our invention for observing the temperature of the furnace and of the object treated therein. Fig. 15 is an elevation showing a simple form of our pyrometer used in connection with a forge, and Fig. 16 is a sectional view of the pyrometer used with the forge.

A is a furnace; B, a draft-pipe entering the furnace having in it a regulating-valve B', operated, as indicated in Figs. 1 and 2, by means of a valve-rod $B^2$ with a hand-wheel $B^3$. C is a flue leading from the furnace A and surrounding the pot E, C' indicating a platform in the center of the flue, and $C^2$ a gutter surrounding the platform and having, as indicated, an opening $C^4$, leading through its wall $C^3$, through which any fluid deposited in the flue can escape.

D indicates a smoke-conduit leading to the stack, through which the gases escape from flue C.

E is a pot, which, as shown, is especially intended to contain molten lead and is formed with a laterally-projecting extension, as indicated at E'.

F F indicate standards, to the tops of which is pivoted the oscillatable shaft F', to which in turn is secured, by means of a laterally-projecting annulus $F^2$, a tube $F^3$, connecting at top with the second tube $F^4$, with the other end of which connects a tube $F^5$, having a closed end, as indicated at $f^5$.

$F^6$, $F^7$, and $F^8$ indicate a system of interior tubes, the end $f^8$ of the tube $F^8$ being opened. $f^6$ indicates a valve in the pipe $F^6$, and $F^9$ indicates an escape-pipe leading from the bottom of the pipe $F^3$, $F^{10}$ indicating a weight which normally holds the pipe system in the positions indicated in Figs. 1 and 2—that is to say, with the pipe $F^8$ immersed in the pot E. The end of the pipe $F^6$ is connected with a source of water-supply, and the water flows through the pipes $F^6$, $F^7$, and $F^8$ and backward through the pipes $F^5$, $F^4$, and $F^3$, escaping through the waste-pipe $F^9$.

G is a clamp secured to the pipe $F^4$ and connected by a rod and chain, as indicated at G' g', with a winding-spindle $G^2$, actuated by a hand-wheel $G^3$, $g^3$ indicating a handle attached to said wheel.

H and H' indicate the framing or support for the body of the pyrometer, $H^2$ indicating a cross-bar extending out from the said framing to the rear of the pivoted cooling-pipe system and serving as a stop to limit the distance to which the said system can be drawn back.

I indicates a metal tube, preferably of wrought-iron, which is clamped in the lateral projection E' of the pot E, as by means of clamp $I^2$. When used in connection with the lead-pot E, and preferably in other modes of use as well, the end I' of the pipe I is closed, as is clearly shown in Figs. 3 and 13. Where, however, the pipe is not immersed in a melted bath or inserted in a furnace, it is sometimes preferable to close the end of the pipe by a thin diaphragm, as indicated at i', Fig. 12, so as to insure the prompt heating of the closed end. Of course an open-ended pipe, as shown in Fig. 13$^a$, can be used in many cases.

J indicates a pipe-section telescoping into the open end of the pipe I, forming a continuation of it. This construction is for the purpose of making the rest of the pyrometer adjustable with reference to the pipe I, and the pipes I and J are, as shown, clamped together by a set-screw $J^2$.

J' indicates still another pipe-section forming a continuation of the pipes I and J and also forming a permanent part of the structure of the pyrometer-box, from which the pipe J is for convenience made adjustable.

K indicates the sight tube or box of the pyrometer, having at its outer edge an opening K', adapted to the face of the operator and through which he looks into the apparatus. At the rear of this tube or box K is shown a vertical partition made up of the parts $K^2$ and $K^3$, extending, respectively, above and below the pipe-section J' and dividing the said rear portion of the box into two chambers $K^{12}$ $K^{12}$.

$K^4$ $K^4$ indicate transverse partition-walls, preferably made at a slight angle to the center of the box, as shown, and in which are formed the three openings $k^4$ $k^4$ $k^4$, the central one being in line with the end of the pipe J'.

$K^5$ (see Figs. 4 and 8) indicates a strip secured on the outside of the partition $K^4$ $K^4$ and serves to hold the plate $K^6$ a slight distance away from said partition. The outline and shape of the strip $K^5$ are indicated in dotted lines in Fig. 9, in which figure, as in Fig. 5, is also shown the conformation of the plate $K^6$, which is formed with three slots in its face, as indicated at $k^6$ $k^6$ $k^6$. The upper portion of the box K is slotted, as indicated at $k^*$, immediately above those slots in the plate $K^6$.

L and L' L' indicate metal plates adapted to slide into the slots in the plate $K^6$ and having at their lower ends circular openings $l$ $l'$ $l'$, which come in line with the openings $k^4$ and by which the diameter and relative size of the actual openings visible from the eyepiece K' are determined. These openings are variable by the use of slides L and L', having openings through them of varying diameters.

$K^7$ $K^7$ indicate the walls of a second transverse partition, also preferably slightly angling to the center, said walls being formed with perforations, as indicated at $k^7$ $k^7$ $k^7$, all in direct line from the eyepiece K', with perforations $k^4$ in the front partition. The space between the partition-walls $K^4$ and $K^7$ is by means of partitions $K^{10}$ $k^{10}$ divided into three chambers $k^8$ $K^8$ $K^8$, corresponding to the openings $k^4$ $k^7$, and the upper part of the sight tube or box is cut away from above these chambers and provided with a lid, as indicated at N.

$K^9$ indicates rearwardly-extending open-ended shields or boxes inclosing the lateral openings $k^7$ $k^7$ and extending back into the light-chambers $K^{12}$ $K^{12}$. The space of said chambers situated to the side of the shield-boxes $K^9$ is indicated at $K^{11}$ $K^{11}$, and in these divisional chambers $K^{11}$ we prefer to place the lamps, which may conveniently be incandescent electric lamps, as indicated at O O. We also preferably line the walls of the light-chambers $K^{12}$ with some non-reflecting material, such as black velvet for the comparison of the lower temperatures or white porcelain for the higher, such a lining being indicated at $k^{12}$, and such lining is also preferably employed on the inner walls of the shield-boxes $K^9$. Access is given to the lamps and to the interior of the light-chambers $K^{12}$ through doors N', the inner faces of which are lined like the rest of the light-chambers.

M (see Figs. 4 and 11) indicates a bottle, which may be of glass or any other material, provided with transparent glass windows, as indicated at $M^2$, and conveniently provided also with a handle, as indicated at M'. These bottles are filled with some translucent color fluid, and one of them is placed in each of the chambers $K^8$, and its glass windows coming opposite to the opening $k^4$ $k^7$, so that the light from the chambers $K^{12}$ will be transmitted through the shield-boxes $K^9$ and through the translucent colored fluid to the eye of the operator at K'. Where the two chambers $K^8$ are utilized, the bottles placed in them are filled with fluids having slightly-different colors—one, for instance, slightly above and the other slightly below the color which it is desired to observe in the tube I. Such a device obviously acts as a guide in the manipulation of the temperature of the object under observation, although we may state here that with a well-trained observer a single color-light at one side of the chamber $K^8$ will be amply sufficient.

In practice and as a result of many experiments we have found that the best results are secured by using an aqueous solution of methyl orange (although other analine orange solutions answer reasonably well) as the translucent solution through which the light is transmitted, the percentage of coloring-matter in the solution giving the shades of red and yellow desired. The colors of the emitted lights are further modified by the character of the reflecting-screens used in the light-chamber, and we further modify the colors by dissolving in the solution varying percentages of nergosene, which is especially valuable in regulating the glow or intensity of the colored emitted light.

In using our apparatus—as, for instance, to cool a previously-heated tool to a determined temperature—a bottle having a fluid contained in it the color of which or of the light transmitted through which is similar to that corresponding with the desired temperature is inserted in one of the chambers $K^8$ and, if desired, another bottle having a slightly-different color inserted in the other chamber. The pot E being filled with lead melted and kept hot by means of the furnace A and flues C, the end of the pipe I is heated to the same temperature as the lead-bath, and the observer looking into the pyrometer sees the color corresponding to the heated end of the pipe I through the chamber $K^8$ and compares it with the standard colors of the light transmitted from the light-chambers $K^{12}$ through the bottles in the chambers $K^8$. If the temperature of the lead-bath is too high, the operator can lower it by actuating the cooling device, the controlling-wheel $G^3$ of which is within easy reach from his observing position. He can also control the temperature of the lead by the hand-wheel $B^3$, controlling the blast-valve B', and by one or both of these devices is able very promptly to bring the temperature of the lead-bath to the desired point at which the color of the heated pipe will be the same as that of the light transmitted through the fluid. The heated tool can then be plunged into the lead-bath and rapidly cooled to, but not below, the temperature of said bath. Obviously also a tool may be heated in the same way. It will also be obvious that our pyrometer is adapted for determining temperature by the simple expedient of slipping various transparent color mediums into the boxes $K^8$ for comparison with the color showing through the chamber $k^8$.

While for reasons already explained we prefer to use as the transparent colored medium through which the light is transmitted a transparent colored fluid, it will be obvious that colored glass can be used in place of the bottle, though it is much more difficult to get the standard colors in glass than it is in the fluids.

While we prefer to use a transparent colored medium and to transmit the light through it, as described, many of the advantages of our pyrometer are obtainable by using a medium in or near the chambers K⁸, in which the light is generated as well as emitted—that is to say, for instance, the lamps O may be placed directly in the chambers K⁸, as indicated in dotted lines in Fig. 8, and the color of the light emitted from the lamps used as the standard of comparison, such color being regulable—as, for instance, by governing the electric current heating the filaments by means of a rheostat. The primary feature of our new pyrometer lies in the construction by means of which emitted colored light is directly compared with the colored light due to the temperature of the object under observation, and it will be clearly understood that in this feature our pyrometer differs radically from previous pyrometers in which temperature has been ascertained by means of a comparison of light intensity as distingished from colored light, our apparatus depending primarily on the comparison of color, though light intensity is also observed and compared.

While for obvious reasons and especially with the lower range of temperatures some means for excluding extraneous light from the eyes of the observer is desirable, such as the sight-tubes K, our pyrometer does not necessarily require such light-excluding devices and can be used as shown in Figs. 15 and 16, in which $k$ indicates the pyrometer-box having a practically identical construction to the light-chamber and colored medium chamber of Figs. 3 and 4, a shelf Q being provided as a rest for a heated tool, as P'. The simple form of pyrometer $k$ can be used with a smith's forge R R' and quenching-trough R², as shown.

As already stated, the closed-ended tube feature of our pyrometer is in itself a valuable means for observing the temperature of heated chambers and receptacles. Thus in Fig. 14 $e$ indicates an annealing-furnace having openings $e'$, and P is a metal body under treatment. When it is desired to ascertain roughly the temperature of the furnace, the closed-ended tube I is inserted, as shown at the left of Fig. 14, and the observer placing his eyes in the eyepiece I³ sees the color corresponding to the heat of the furnace. If the heat of the metal P is to be ascertained, the end of the tube I is brought in contact with it, as shown at the right of Fig. 14. In using the tubes in furnaces it is advisable to cover their sides with non-conducting jackets, as shown at $i$.

In order to secure uniformity throughout the mass of heated lead, it is desirable to keep the molten lead moving inside the pot by artificial means. Therefore an agitator, driven by any suitable driving mechanism, is shown in Figs. 1 and 2, consisting of a shaft S, extending from the driving mechanism above and outside of the lead-pot down into the lead and having on its lower end a propeller P. When this shaft with its submerged propeller is rotated at sufficient speed, the lead in the pot is kept moving from one part of the pot to another, and in this way its temperature is equalized throughout the mass.

Having now described our invention, what we claim as new, and desire to secure by Letters Patent, is—

1. An optical pyrometer for gaging the temperature of a substance, comprising a light-emitting standard adapted to emit rays having approximately the color and intensity which would be emitted from said substance when the latter is heated to the desired temperature, said pyrometer being arranged to bring said substance and standard simultaneously within the line of vision.

2. An optical pyrometer for gaging the temperature of a substance, comprising a light-emitting standard adapted to emit light-rays having approximately the color and intensity of the light which would be emitted from said substance when the latter is heated to the desired temperature, in combination with a tube through which the color and intensity of the light-rays emitted by the standard and substance are brought simultaneously to the eye of the observer.

3. An optical pyrometer for judging the heat of incandescent bodies, consisting of a light-chamber, an artificial light situated in said chamber and means for imparting, to the light-rays emitted from said chamber, color and intensity approximating the color and intensity of the rays emitted from the incandescent body at a known temperature, said means consisting of a colored translucent screen arranged to transmit the light-rays from the light-chamber and to emit said rays with the desired color and intensity imparted thereto.

4. An optical pyrometer for judging the heat of incandescent bodies, consisting of a light-chamber, an artificial light situated in said chamber and means for imparting, to the light-rays emitted from said chamber, color and intensity approximating the color and intensity of the rays emitted from the incandescent body at a known temperature, said means consisting of a colored translucent screen made up of a colored translucent liquid inclosed in transparent walls and being arranged to transmit the light-rays from the light-chamber and to emit said rays with the desired color and intensity imparted thereto.

5. An optical pyrometer for judging the heat of incandescent bodies, consisting of a light-chamber, an artificial light situated in said chamber and means for imparting, to the light-rays emitted from said chamber, color and intensity approximating the color and intensity of the rays emitted from the incandescent body at a known temperature, said means consisting of a colored translucent screen made up of a colored translucent solution of methyl orange inclosed in transparent walls and being arranged to transmit the light-rays from the light-chamber and to emit said rays with the desired color and intensity imparted thereto.

6. An optical pyrometer for judging the heat of incandescent bodies, consisting of a light-chamber, an artificial light situated in said chamber and means for imparting, to the light-rays emitted from said chamber, color and intensity approximating the color and intensity of the rays emitted from the incandescent body at a known temperature, said means consisting of a colored translucent screen made up of a colored translucent solution of methyl orange and negrosene inclosed in transparent walls and being arranged to transmit the light-rays from the light-chamber and to emit said rays with the desired color and intensity imparted thereto.

7. An optical pyrometer for judging the heat of incandescent bodies consisting of a light-chamber, a screen-box extending from one side of said chamber into it, a colored translucent medium situated in the portion of the wall of the chamber inclosed by the screen-box through which the light is emitted, and an artificial light situated in the light-chamber at one side of the screen-box and so that only its reflected and diffused light is transmitted through the translucent medium aforesaid.

8. An optical pyrometer for judging the heat of incandescent bodies consisting of a light-chamber, a screen-box extending from one side of said chamber into it, a colored translucent medium situated in the portion of the wall of the chamber inclosed by the screen-box through which the light is emitted, a removable light-reflecting screen situated in the light-chamber at the rear of the screen-box, and an artificial light situated in the light-chamber at one side of the screen-box and so that only its reflected and diffused light is transmitted through the translucent medium aforesaid.

9. In an optical pyrometer for judging the heat of incandescent bodies, a tube having one closed end adapted to be subjected to the heat of a furnace or other object to be tested and having its open end arranged in the line of vision, in combination with a light-emitting standard for measuring the temperature indicated by the light given off by the heated end of the tube.

10. In an optical pyrometer for judging the heat of incandescent bodies, a tube having one closed end adapted to be subjected to the heat of a furnace or other object to be tested and having its open end arranged in the line of vision, in combination with a light-emitting medium adapted to emit light of a known color approximating that given off by the heated object at a determined temperature arranged close to the open end of the tube so as to be simultaneously in view.

11. In an optical pyrometer for judging the heat of incandescent bodies, a tube having a closed end and an open end arranged in line with each other, in combination with a light-box having a translucent colored medium situated in its wall in juxtaposition with the open end of the tube, said translucent medium being adapted to emit light-rays having approximately the color and intensity which would be emitted from the tube end when heated to a known temperature, and an artificial light situated in the light-box.

12. An optical pyrometer for judging the heat of incandescent bodies, having in it an opening through which the object, the temperature of which is to be ascertained, can be observed, and close to said opening a second opening, a light-emitting device adapted to emit through said second opening light-rays approximating in color and intensity those emitted from the incandescent body at a known temperature, and means whereby the rays of said light-emitting device and the object, the temperature of which is to be ascertained, can be observed simultaneously and with exclusion of other light from the eye.

13. An optical pyrometer having in it an opening through which the object, the temperature of which is to be ascertained, can be observed, and close to said opening a second opening, a tube leading from the first opening and adapted to be placed in contact with the object aforesaid, a light-emitting device adapted to emit, through the second opening aforesaid, light-rays approximating in color and intensity those emitted from the incandescent body at a known temperature, and means whereby the rays of said light-emitting device and the object, the temperature of which is to be ascertained, can be observed simultaneously and with exclusion of other light from the eye.

14. An optical pyrometer having in it an opening through which the object, the temperature of which is to be ascertained, can be observed, and close to said opening a second opening, a tube closed at one end having its open end in said first opening and adapted to have its closed end raised to the temperature which is to be ascertained, a light-emitting device adapted to emit, through the second opening aforesaid, light-rays in color and intensity approximating those emitted from the closed end of the tube when heated to a determined degree, and means whereby the rays of said light-emitting device and the heated closed end of the tube can be observed simultaneously with exclusion of other light from the eye.

15. An optical pyrometer having in it an opening through which the object, the temperature of which is to be ascertained, can be observed, and close to said opening a second opening, a translucent colored medium, a light situated behind said medium and adapted to project its rays through said medium and said second opening, and means whereby the rays emitted from said translucent medium and the object, the temperature of which is to be ascertained, can be observed simultaneously and with exclusion of other light from the eye.

16. An optical pyrometer having in it an opening through which the object, the temperature of which is to be ascertained, can be observed, and close to said opening a second opening, a translucent colored fluid secured between transparent walls, said fluid being adapted to transmit and emit light-rays approximating in color and intensity those emitted from the heated object at a known temperature, a lamp so situated that its rays are transmitted through the said second opening and fluid medium, and means whereby the rays of said light-emitting medium and the object aforesaid can be observed simultaneously and with exclusion of other light from the eye.

17. In an optical pyrometer, a closed-ended tube adapted to be placed in or in contact with the object, the temperature of which is to be ascertained, and arranged in line with the eyepiece of the instrument in combination with a standard light-emitting medium adapted to emit light-rays approximating in color and intensity the rays emitted from the closed-ended tube at a known temperature also arranged in the instrument close to the end of the tube.

18. An optical pyrometer, having an opening arranged in the line of vision through which the object, the temperature of which is to be ascertained, is observed, provided with a second and third openings arranged close to the first and light-emitting medium of known but slightly-different colors arranged to transmit their rays through the said second and third openings.

19. An optical pyrometer, having an opening arranged in the line of vision through which the object, the temperature of which is to be ascertained, is observed, provided with a second and third openings arranged close to the first, transparent mediums of known but slightly-different colors arranged to transmit their rays through the said second or third openings and lamps arranged to transmit their light to the eye through said transparent mediums.

20. An optical pyrometer, having an opening arranged in the line of vision through which the object, the temperature of which is to be ascertained, is observed provided with a second opening arranged close to the first, a transparent colored medium situated in the second opening, a shield-box $K^9$ extending back from the second opening, a light-chamber $K^{12}$ situated in the rear of the shield and a lamp situated in a portion $K^{11}$ of chamber $K^{12}$ at the side of the shield.

21. An optical pyrometer, having an opening arranged in the line of vision through which the object, the temperature of which is to be ascertained, is observed, provided with a chamber $K^8$ situated to one side of said opening and having openings $k^6$ $k^7$ at front and rear, a transparent colored medium removably situated in said chamber, a shield $K^9$ extending back from the rear opening in said chamber, a light-chamber inclosing said shield and a lamp situated in said chamber at one side of the shield.

FREDERICK W. TAYLOR.
    HENRY L. GANTT.

Witnesses:
 EDWARD J. MALLOY,
 PAUL E. BALLIET.